(12) United States Patent
Wakao

(10) Patent No.: US 8,737,628 B2
(45) Date of Patent: May 27, 2014

(54) METHOD FOR ESTIMATING ROAD SURFACE STATE

(75) Inventor: Yasumichi Wakao, Musashino (JP)

(73) Assignee: Bridgestone Corporation, Tokyo (JP)

( * ) Notice: Subject to any disclaimer, the term of this patent is extended or adjusted under 35 U.S.C. 154(b) by 460 days.

(21) Appl. No.: 13/125,924

(22) PCT Filed: Sep. 7, 2009

(86) PCT No.: PCT/JP2009/065592
§ 371 (c)(1),
(2), (4) Date: Apr. 25, 2011

(87) PCT Pub. No.: WO2010/050300
PCT Pub. Date: May 6, 2010

(65) Prior Publication Data
US 2011/0200199 A1   Aug. 18, 2011

(30) Foreign Application Priority Data
Oct. 30, 2008 (JP) ................................. 2008-280023

(51) Int. Cl.
*H04R 25/00* (2006.01)
(52) U.S. Cl.
USPC .............................................. 381/56; 73/579
(58) Field of Classification Search
USPC ...................................................... 381/56–58
See application file for complete search history.

(56) References Cited

U.S. PATENT DOCUMENTS

| | | |
|---|---|---|
| 5,586,028 A | 12/1996 | Sekine et al. |
| 2008/0240457 A1* | 10/2008 | Inoue et al. ................. 381/71.4 |

FOREIGN PATENT DOCUMENTS

| | | |
|---|---|---|
| JP | 06-174543 A | 6/1994 |
| JP | 07-156782 A | 6/1995 |
| JP | 08-261993 A | 10/1996 |
| JP | 2005-106728 A | 4/2005 |

OTHER PUBLICATIONS http://www.edn.com/electronics-news/4382916/Analyze-signals-octave-by-octave.*
International Search Report PCT/JP2009/065592, Nov. 24, 2009.
Japanese Office Action issued in Japanese Application No. 2010-535723 dated Aug. 13, 2013.

* cited by examiner

*Primary Examiner* — Joseph Saunders, Jr.
(74) *Attorney, Agent, or Firm* — Sughrue Mion, PLLC

(57) ABSTRACT

There is provided a method for determining a road surface state which can accurately estimate the road surface state on which a vehicle is running at one of finely classified road surface states based on a sound detection signal from a ground contact surface sound detection unit for detecting a sound in the vicinity of the ground contact surface of the tire of the running vehicle.

The method calculates a wave profile of frequency dispersion by executing a 1/N octave analysis of a detected sound signal from a sound detection unit 20 for estimating a road surface state. The state of the road surface on which the vehicle is running is determined whether the calculated wave profile of frequency dispersion satisfies predetermined determination conditions of the respective road surface states. A microphone housed in a container is used to detect said sound, and the determining step is adapted to apply the determination conditions to the measured wave profile including a resonance caused by the container.

7 Claims, 4 Drawing Sheets

METHOD FOR ESTIMATING ROAD SURFACE STATE

CROSS REFERENCE TO RELATED APPLICATIONS

This application is a National Stage of International Application No. PCT/JP2009/065592 filed Sep. 7, 2009, claiming priority based on Japanese Patent Application No. 2008-280023 filed Oct. 30, 2008, the contents of all of which are incorporated herein by reference in their entirety.

TECHNICAL FIELD

The present invention relates to a method for estimating a road surface state, the method estimating the current road state on which a vehicle is running at one of predetermined road states based on a sound detection signal from a ground contact surface sound detection unit for detecting a sound in the vicinity of the ground contact surface of the tire of the running vehicle.

RELATED ART

Detecting a state of a road surface with which a running vehicle contacts in real time is of significance and achieves such effects that the safety of the running vehicle can be improved by notifying a driver of information regarding the state, and that an anti-lock braking system can be effectively operated by knowing the road surface state. As a method for detecting a road surface state, proposed is a method in which a slip rate is measured and the coefficient of friction calculated therefrom is used to determine the road surface state. The calculated coefficient of friction is, however, extremely unreliable when the slip rate is small, which causes a problem that the road surface state cannot be estimated well. As a countermeasure to this problem, it is proposed to detect sounds in the vicinity of the ground contact surface of the tire and determine the road surface state based on frequency-analysis data of the detected sounds. This method utilizes the fact that the sound caused when the tire contacts the road surface varies in accordance with the road surface state.

It has also been practiced that the road surface state changing due to the weather condition is monitored and the road surface is managed to be used safely. For example, a vehicle for managing a road surface (a probe car) is run to monitor the road surface state constantly, and if it starts snowing, an instruction for use of a snow melting agent is provided. Conventionally, the estimation of the road surface state depends on a visual inspection by a human, so that there have been problems that the determination is not correct and numerous manpower is needed. It has, thus, been demanded to determine the road surface state easily and accurately.

To deal with these problems, Patent Reference 1 discloses a method in which an average of acoustic pressure levels within a preset frequency region, and the road surface state is determined as one of a heavy wet state, a light wet state, a dry state and an icebahn (a frozen state) depending on the average of acoustic pressure level. Patent Reference 2 discloses a method in which a frequency range where frequency analysis data is characteristically changed by the road surface state (for example, 1-2 kHz) and a frequency range where frequency analysis data is not significantly changed by the road state are selected; a ratio between average sound pressure levels of the respective frequency ranges are calculated; and the road surface state is determined as, for example, a flooding state or a dry state depending on the magnitude of the ratio.

RELATED ART DOCUMENTS

Patent Reference 1: JP 6174543 A
Patent Reference 2: JP 8261993 A

DISCLOSURE OF THE INVENTION

However, in the method for estimating a road surface state disclosed in Patent Reference 1, since only one frequency region is used to determine the state, the average of acoustic pressure levels may be substantially same as that of the reference state in the preset frequency range while the average of acoustic pressure levels may be far different from that of the reference state. As a result, it is found that, for example, a smooth asphalt road surface and slightly wet road surface cannot be distinguished. In the method for estimating a road surface state disclosed in Patent Reference 2, for example, only two road surface state can be determined. It is a problem that the number of determinable road surface state is extremely limited.

The present invention has been made in view of these drawbacks, and the object of the present invention is to provide a method for determining a road surface state which can estimate the road surface state on which a vehicle is running at one of finely classified road surface states based on a sound detection signal from a ground contact surface sound detection unit for detecting a sound in the vicinity of the ground contact surface of the tire of the running vehicle, and an apparatus and a system used for such a method.

<1> There is provided a method for estimating a road surface state, the method estimating the current road state on which a vehicle is running at one of predetermined road states based on a sound detection signal from a ground contact surface sound detection unit for detecting a sound in the vicinity of the ground contact surface of the tire of the running vehicle, comprising the steps of: calculating a wave profile of frequency dispersion as said sound detection signal by executing a 1/N octave analysis of said detected sound during the vehicle being running, and determining whether said calculated wave profile of frequency dispersion (hereinafter referred to as a "measured wave profile") satisfies predetermined determination conditions of the respective road surface states to estimate the road surface state,
wherein a microphone arranged in a container is used to detect said sound, and said determining step is adapted to apply said determination conditions to said measured wave profile including a resonance caused by the container.

<2> In the above aspect <1>, a sound from anterior of a rear wheel of the vehicle may be used as said sound to be detected.

<3> In the above aspect <1> or <2>, a first determination condition is such that a minimum value of a sound pressure of a band having higher frequency than a band including a frequencies of said resonance caused by the container (hereinafter referred to as a "container resonance frequency band") is larger than a minimum value of a sound pressure of a band having lower frequency than the container resonance frequency band;
a second determination condition is such that five frequency bands including a band where the sound pressure is the smallest out of bands having lower frequency than the container resonance frequency band contain two bands where the sound pressure is minimal or minimum;

a third determination condition is such that a sound pressure of a band having a second lowest frequency is larger than sound pressures of any other band having lower frequencies than the container resonance frequency band;

a forth determination condition is such that the container resonance frequency band is referred to as a band X, a band having the lowest frequency among bands having higher frequencies than the container resonance frequency band having a lower sound pressure than a minimum sound pressure of the bands having lower frequency than the container resonance frequency band is referred to a band Y, and all bands between the band X and the band Y have higher sound pressures than a straight line connecting the sound pressures of the bands X and Y; and the road surface state may be estimated with at least one of the first to forth determination conditions.

<4> In the above aspect <3>, when the measured wave profile satisfies the first determination condition, the road surface corresponding to the measured wave profile may be estimated at in a wet state.

<5> In the above aspect <3>, when the measured wave profile satisfies the second determination condition, the road surface corresponding to the measured wave profile may be estimated at in a frozen state.

<6> In the above aspect <3>, when the measured wave profile satisfies at least one of the third and forth determination conditions, the road surface corresponding to the measured wave profile may be estimated at in a dry state.

<7> In the above aspect <3>, when the measured wave profile satisfies none of the first to forth determination conditions, the road surface corresponding to the measured wave profile may be estimated at in a slushy or snowy state.

<8> In the above aspect <3>, the method further comprises the steps of:

comparing, in a first step, the measured wave profile with said first determination condition, and, when the measured wave profile satisfies the first determination condition, estimating the road surface corresponding to the measured wave profile at in a wet state;

when the measured wave profile does not satisfy the first determination condition in the first step, subsequently comparing, in a second step, the measured wave profile with said second determination condition, and, when the measured wave profile satisfies the second determination condition, estimating the road surface corresponding to the measured wave profile at in a frozen state;

when the measured wave profile does not satisfy the second determination condition in the second step, subsequently comparing, in a third step, the measured wave profile with said third and forth determination conditions, and, when the measured wave profile satisfies at least one of the third and forth determination conditions, estimating the road surface corresponding to the measured wave profile at in a dry state; and when the measured wave profile does not satisfy the third and forth determination conditions in the third step, estimating the road surface corresponding to the measured wave profile at in a slush or snowy state.

According to the aspect <1>, the current road state on which a vehicle is running is estimated by calculating a wave profile of frequency dispersion as said sound detection signal by executing a 1/N octave analysis of said detected sound during the vehicle being running, and determining whether said calculated wave profile of frequency dispersion satisfies predetermined determination conditions of the respective road surface states to estimate the road surface state, so that the current road state can be precisely estimated at one of finely classified road state such as wet state, dry state, frozen state and slushy state as discussed below in detail. In particular, a 1/N octave dispersion profile such as a ⅓ octave dispersion profile is used as a dispersion profile of a frequency to be analyzed to decrease the resonance associated with a road noise and obtain a sound pressure spectrum reproducible with similar road surfaces. This enables a robust determination of the road surface. Further, a microphone arranged in a container is used to detect the sound, so that the microphone can be prevented from an immediate break down caused by a flying stone from the road surface or a direct exposure to water. In this case, the determining step is adapted to apply the determination conditions to the measured wave profile including a resonance caused by the container, so that the obtained wave profile can be subjected to the determination as it is to estimate the road surface state without a necessity of an additional operation such as a separation of the resonance.

According to the aspect <2>, a sound from anterior of a rear wheel of the vehicle is used as the sound to be detected, so that the determination of the road surface state can be more accurately performed. This is because the rear wheel contacts the road surface after the road surface is settled, and thus a pure road noise can be easily obtained. In contrast, if a sound from a front wheel, which firstly disrupts the road surface, is used, there is a problem that an undesired sound such as a sound caused when the snow on a snowy road is packed is contained as a noise.

According to the aspect <3>, at least one of the first to forth determination conditions which are clearly defined in the above-mentioned manners are used to estimate the road surface state, so that the estimation without fluctuation can be performed.

According to the aspect <4>, when the measured wave profile satisfies the first determination condition, the road surface corresponding to the measured wave profile is estimated at in a wet state, so that the wet state can be accurately estimated.

According to the aspect <5>, when the measured wave profile satisfies the second determination condition, the road surface corresponding to the measured wave profile is estimated at in a frozen state, so that the frozen state can be accurately estimated.

According to the aspect <6>, when the measured wave profile satisfies at least one of the third and forth determination conditions, the road surface corresponding to the measured wave profile is estimated at in a dry state, so that the dry state can be accurately estimated.

According to the aspect <7>, when the measured wave profile satisfies none of the first to forth determination conditions, it is determined not to be any of wet, frozen and dry states, which corresponds to a slushy or snowy state, so that the slushy and snowy state can be accurately estimated.

According to the aspect <8>, the first to third steps are carried out in this order as mentioned above, so that even when the measured wave profile satisfies two or more of the first to forth requirements, a more precise state can be estimated alternatively. This can further enhance the accuracy of the estimation.

BEST MODE FOR CARRYING OUT THE INVENTION

Figure 1:
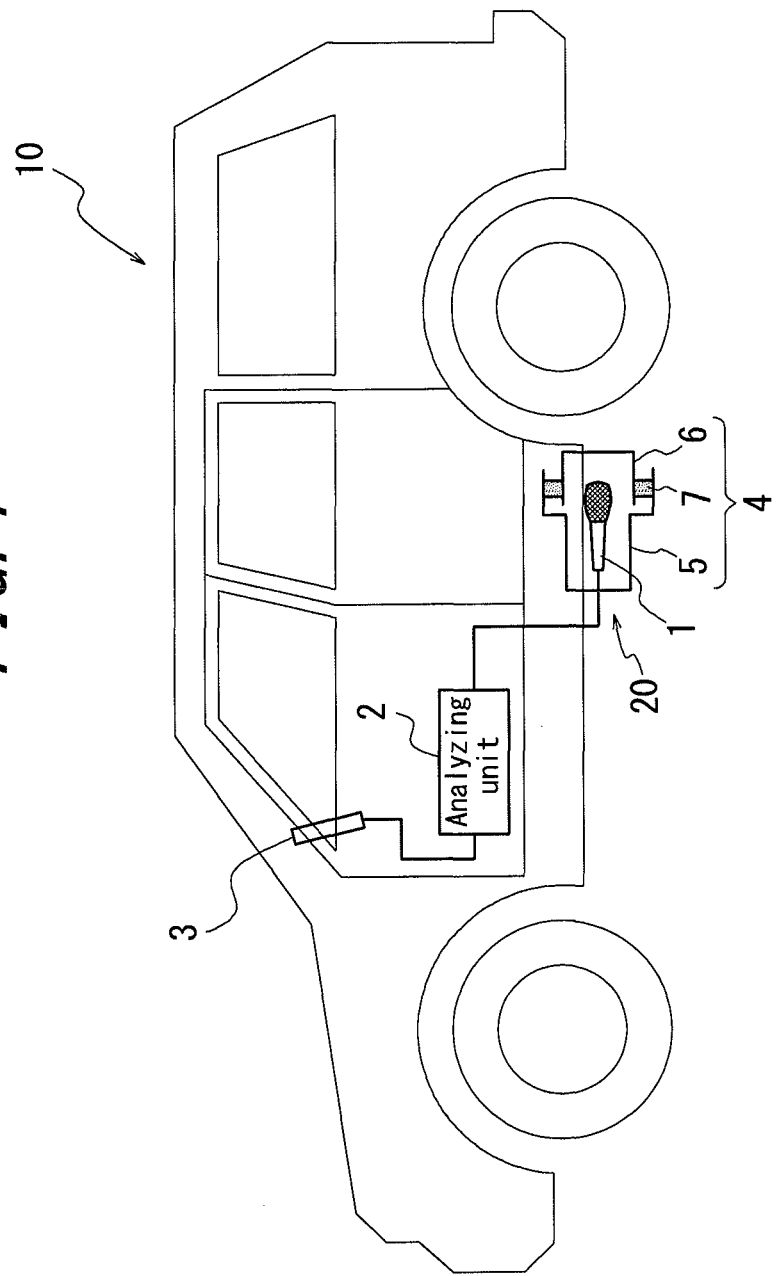
FIG. 1 is a block diagram showing a configuration of a device for estimating a road surface state used in a method for estimating a road surface state of one embodiment according to the present invention.

Hereinafter, an embodiment according to the present invention is discussed. FIG. 1 is a schematic diagram of a device for estimating a road surface state used in a method for estimating a road surface state of one embodiment according to the present invention. A road-surface-state estimating device 10 is adapted to have a sound detection unit 20 for estimating a road surface state which detects a sound in the vicinity of the ground contact surface, and a computing unit 2 for estimating a road state on which a vehicle is running by calculating a wave profile of frequency dispersion from the sound detection signal from the sound detection unit 20 to obtain a measured wave profile and determining whether the measured wave profile satisfies predetermined determination conditions. In addition, the road-surface-state estimating device 10 may have an indicator 3 for notifying to the driver the road surface state on which the vehicle is running. Moreover, an alarm unit (not shown) may be provided for giving a warning to the driver when the road surface state is classified to a predetermined dangerous situation. Such an alarm unit may used sound, light or vibration.

The sound detection unit 20 for estimating a road surface state preferably consists of a microphone 1 constituting a ground contact surface sound detection unit, and a container 4 housing the microphone 1. This makes it possible to prevent the microphone from an immediate break down caused by a flying stone from the road surface or a direct exposure to water. In this case, although the microphone also collects the resonance caused by the container, the determining step is adapted to apply the determination conditions to the measured wave profile including a resonance caused by the container. Thus, the obtained wave profile can be subjected to the determination as it is to estimate the road surface state.

The resonance frequency of the container is preferably 800 Hz-1600 Hz. Within this frequency range, the determination can be carried out by using the above-mentioned predetermined determination conditions without any modifications.

In this case, the container 4 can be composed of, for example, a container body 5, a cover 6 separated from the container body 5, and a sponge-like elastic body 7 elastically connecting the container body 5 and the cover 6 to allow a sound from outside to pass through voids in the sponge-like elastic body 7 and to allow the microphone 1 in the container 4 to collect the sound. Concurrently, the cover 6 can be elastically supported by the container body 5.

The sound detection unit 20 for estimating a road surface state is preferably attached to the rear wheel. This is because, as compared with the front wheel, the rear wheel contacts the road surface after the road surface is settled, and thus a pure road noise can be easily obtained. As a result, the sounds from the rear wheel may clearly differ with respect to the road surface state such as dry, wet and frozen states, and thus the accuracy of the estimation of the road surface state can be greatly improved. In addition, the microphone is preferably arranged rather in front of the rear wheel than in back of it. When the microphone is arranged in back of the rear wheel, splashed water and mud may hit the microphone to easily create a noise.

The wave profile of frequency dispersion may include a wave profile of frequency dispersion obtained directly from an FFT analyzer, or a wave profile of frequency dispersion processed by a 1/N octave analysis. In the present invention, a wave profile of frequency processed by a 1/N octave analysis is used to decrease an effect of the resonance associated with a road noise and obtain a sound pressure spectrum reproducible with similar road surfaces. Especially, when n is three, i.e., a ⅓ octave dispersion profile is used, it is possible to satisfy both of a uniform distribution of the sound pressure and a good resolution.

The computing unit 2 calculates the measured wave profile, then determines whether the measured wave profile satisfies predetermined one or more determination conditions, and estimates the road surface condition depending on the determination results. As the determination conditions, each of frequency ranges divided into 1/N octaves and aligned according to the levels of frequency is referred to as a band, and sound pressures of two or more bands preferably have predetermined relationships.

Hereinafter, discussed in detail is an example in which the state of the road surface on which the vehicle is running is determined as one of predetermined road surface states, i.e. wet, frozen, dry and slushy/snowy states. It is noted that the unit shown in FIG. 1 is used as the detection unit 20 for estimating a road surface state, and the container 4 is sized to have a resonance frequency within a range of 800 Hz-1600 Hz. In particular, the container is designed to have a diameter of about 50 mm and a length of about 200 mm, which gives a resonance frequency of about 1000 Hz.

Figure 2:
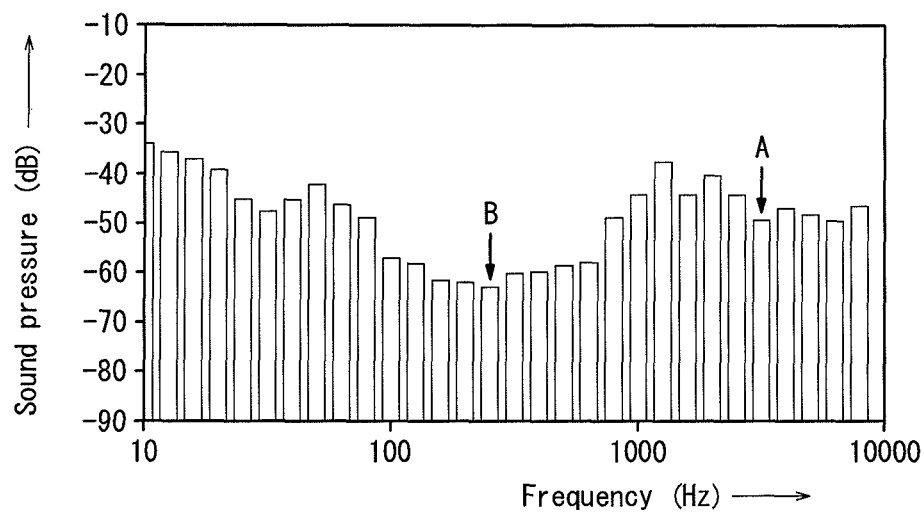
FIG. 2 is a graph representing a typical measured wave profile of a wet road surface.

FIG. 2 is a graph showing a measured wave profile of a wet road surface with using a ⅓ octave analysis. The horizontal axis represents a frequency and the vertical axis represents a sound pressure in dB (decibel). The bars each representing a band are aligned in order of their frequencies, and the heights of the bars represent the sound pressures. In the followings, the measured wave profile refers to the one having been subjected to a ⅓ octave analysis.

When the road surface is in a wet state, the sound produced by the road surface contains a noise which is produced when blocks of the tire hit a water film and which spreads into a high frequency region. The measured wave profile of this sound is characterized in that it has a small attenuation at around 1000 Hz, i.e. the region immediately above the container resonance frequency band. More specifically, in the measured wave profile, the minimum sound pressure of the frequency band situated in a higher frequency region than the container resonance frequency band is larger than the minimum sound pressure of the frequency band situated in a lower frequency region than the container resonance frequency band. This is adopted as the first determination condition.

That is, with reference to FIG. 2, the first determination condition is that the sound pressure of the band which is denoted by the arrow A and which has the smallest sound pressure among the bands having higher frequency than the container resonance frequency band is larger than the sound pressure of the band which is denoted by the arrow B and which has the smallest sound pressure among the bands having lower frequency than the container resonance frequency band.

Figure 3:
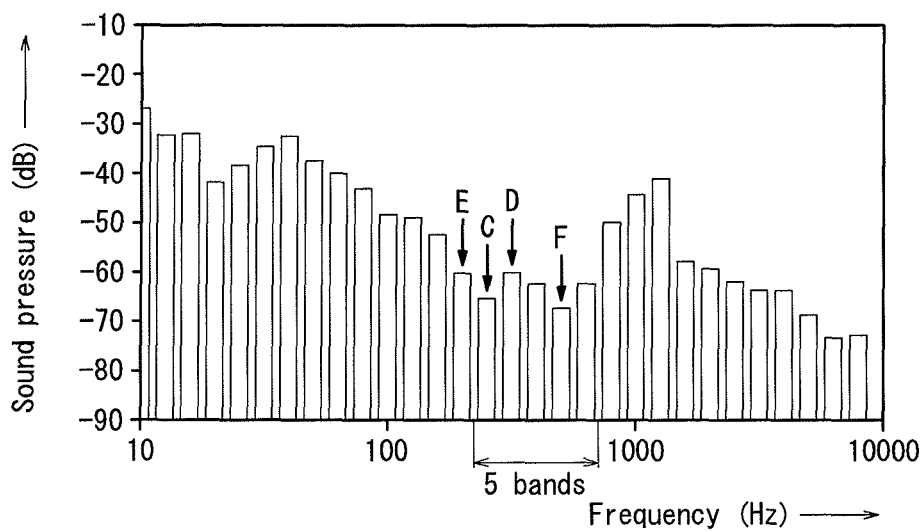
FIG. 3 is a graph representing another typical measured wave profile of a frozen road surface.

FIG. 3 is a graph representing a measured wave profile of a frozen road surface. On a frozen road surface, the measured wave profile is characterized in that it has a small peak appearing around 300 Hz-500 Hz due to a slippage of blocks of the tire upon touching the road surface. More specifically, in the ⅓ octave frequency wave profile, five frequency bands including a band where the sound pressure is the smallest out of bands having lower frequency than the container resonance frequency band contain two bands where the sound pressure is minimal or minimum. This is adopted as the second determination condition.

That is, with reference to FIG. 3, the second determination condition is that the five frequency bands including a band which is denoted by the arrow F and which has the smallest sound pressure among the bands having lower frequency than the container resonance frequency band except for a direct current component contain two bands (denoted respectively by the arrows C and F) which have the minimal sound pressure. The band denoted by the arrow C has a smaller sound pressure than those of the adjacent bands denoted by the arrows E and D, so that it is the band having a minimal sound pressure. Similarly, the band denoted by the arrow F has a minimal sound pressure.

Figure 4:
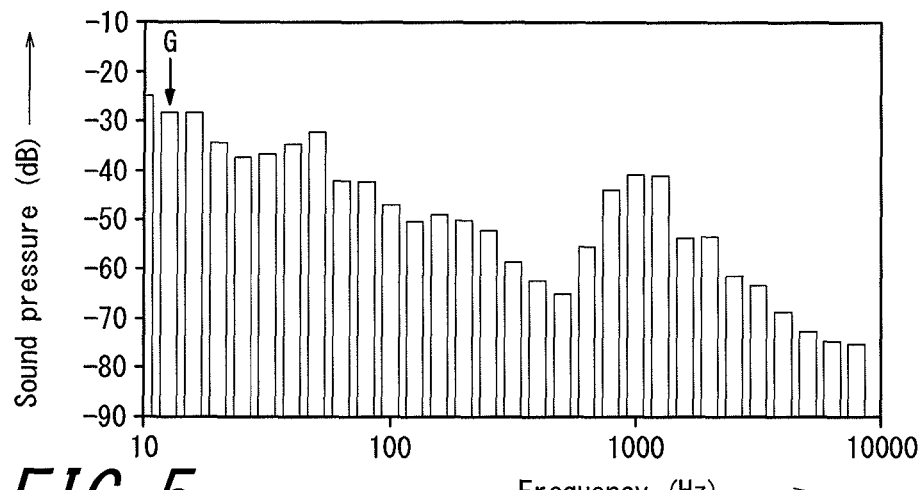
FIG. 4 is a graph representing a typical measured wave profile of a dry road surface having a third feature point.

FIG. 4 shows the first pattern of the measured wave profile obtained from a dry road surface. In the first pattern where the road surface is in a dry state, the lowest frequency band except for the band composed of a direct current component having a zero frequency, in other words, the band having the second smallest frequency has a sound pressure larger than the sound pressures of any other bands having lower frequency than the container resonance frequency band. This is adopted as the third determination condition.

This is further discussed with reference to FIG. 4. The third determination condition is that the sound pressure of the band which sits at the second position from the lowest frequency and denoted by the arrow G is higher than the sound pressures of any other band.

Figure 5:
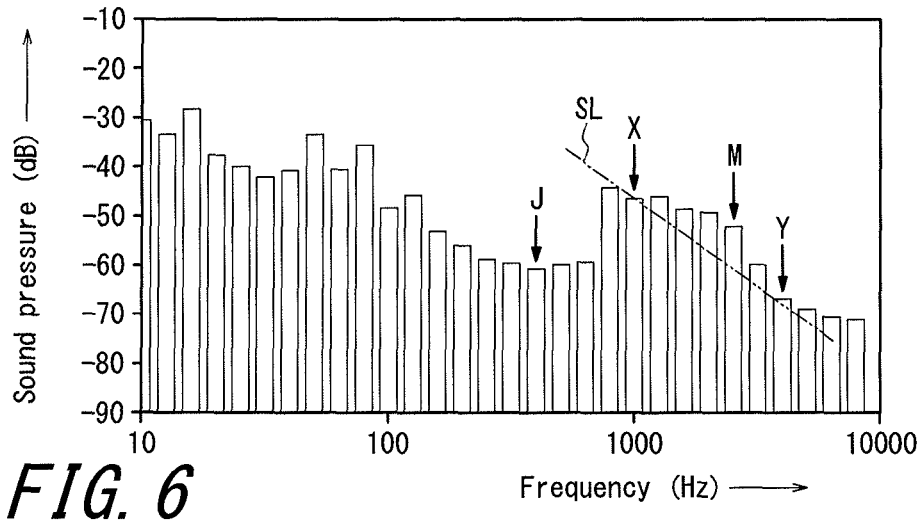
FIG. 5 is a graph representing a typical measured wave profile of a dry road surface having a second feature point.

FIG. 5 shows the second pattern of the measured wave profile obtained from a dry road surface. Even when the road surface is in a dry state, there may be a case that the measured wave profile does not satisfy the above-mentioned third determination condition. In this case, with reference to FIG. 5, the fourth determination condition is that the container resonance frequency band (denoted by the arrow X) is referred to as a band X, a band (denoted by the arrow Y) having the lowest frequency among bands having higher frequencies than the container resonance frequency band having a lower sound pressure than a minimum sound pressure (the sound pressure of the band denoted by the arrow J) of the bands having lower frequency than the container resonance frequency band is referred to a band Y, and all bands between the band X and the band Y have higher sound pressures than a straight line connecting the sound pressures of the bands X and Y. If the measured wave profile satisfies the forth determination condition, the road surface is determined as a dry state.

Figure 6:
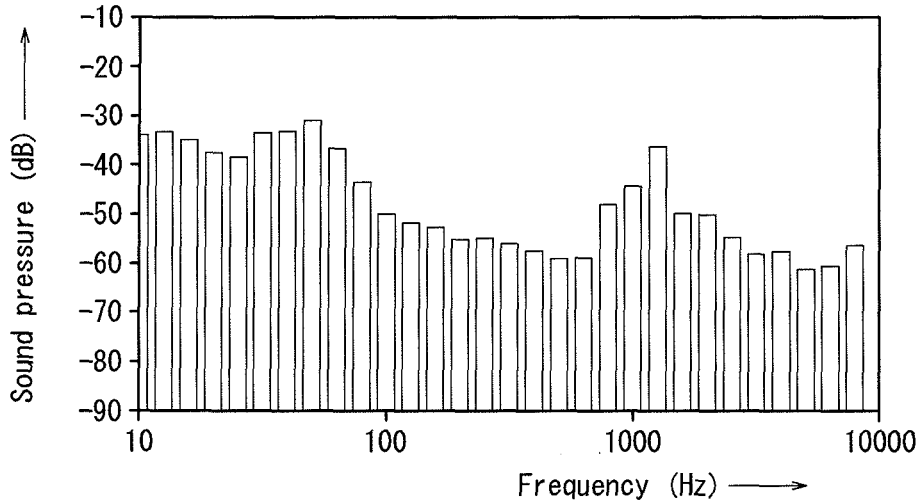
FIG. 6 is a graph exemplifying a measured wave profile of a slushy road surface.

FIG. 6 shows the measured wave profile obtained from a slushy or snowy road surface which is characterized by not satisfying any of the above-mentioned first to forth determination conditions.

As mentioned above, it is possible that only the first determination is used in the above-mentioned manner to determine whether the road surface is in a wet state; similarly only the second determination condition is used in the above-mentioned manner to determine whether the road surface is in a frozen state; and only the third and forth determination conditions are used in the above-mentioned manner to determine whether the road surface is in a dry state. In order to alternatively decide which of the road state corresponds to the measured wave profile, the estimation is preferably conducted in the following manner in consideration of a case where the measured wave profile satisfies two or more determination.

Figure 7:
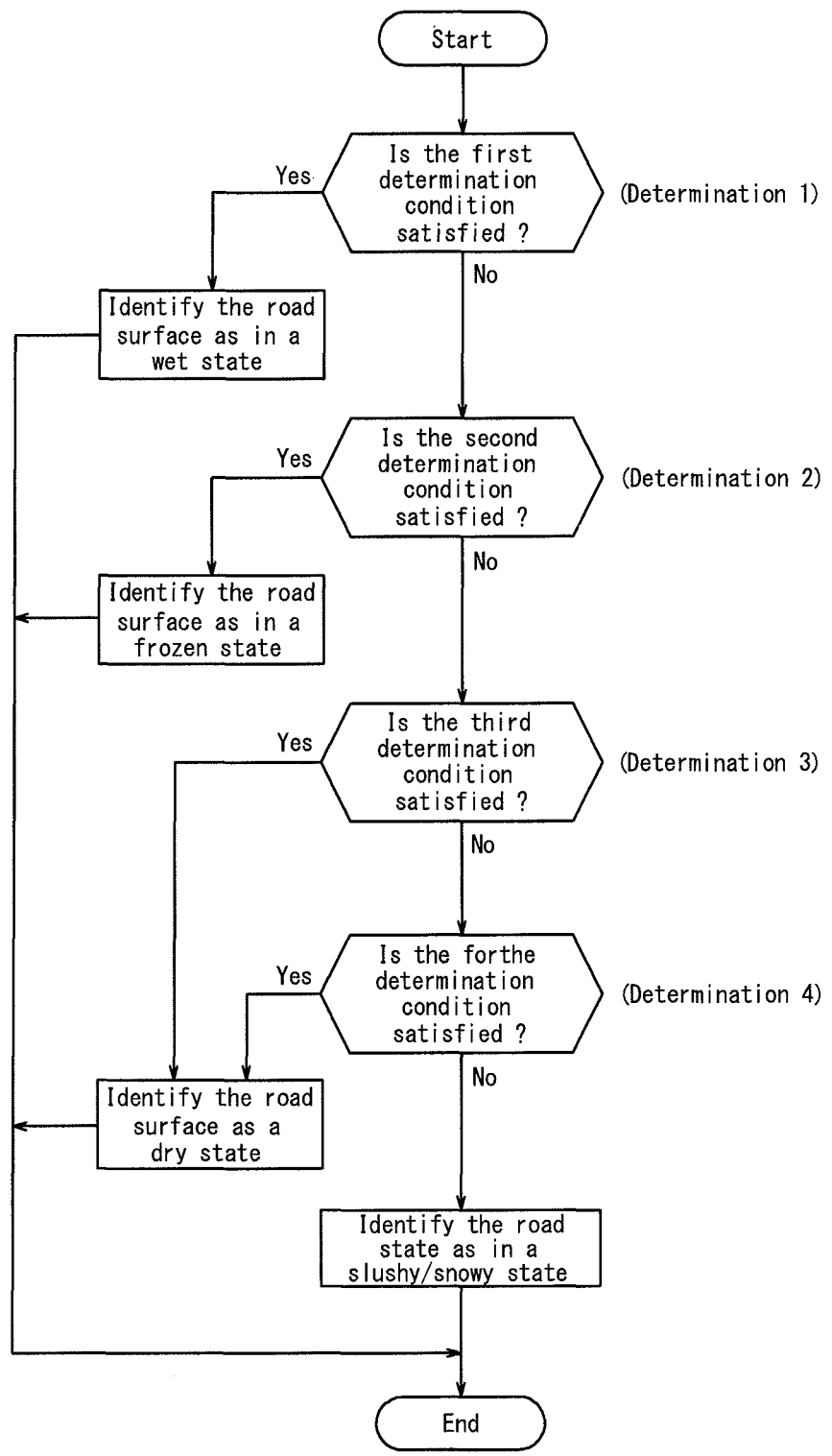
FIG. 7 is a flow chart indicating an example of a process of estimating a road surface state.

FIG. 7 is a flow chart indicating an example of a process of estimating a road surface state which is optimized for this purpose. After receiving a signal commanding the computing unit 2 to start computing (Start), the computing unit 2 firstly determines whether the measured wave profile satisfies the first determination condition, as shown in FIG. 7 (Step 1). Then, if the measured wave profile turns out to satisfy the first determination condition, the road surface is estimated at in a wet state. On the other hand, if the measured wave profile turns out to not satisfy the first determination condition, it is determined whether the measured wave profile satisfies the second determination condition (Step 2). Thereafter, if the measured wave profile turns out to satisfy the second determination condition, the road surface is estimated at in a frozen state. In Step 2, if the measured wave profile turns out to not satisfy the second determination condition, it is determined whether the measured wave profile satisfies the third determination condition (Step 3). Subsequently, if the measured wave profile turns out to satisfy the third determination condition, the road surface is estimated at in a dry state. In Step 3, if the measured wave profile turns out to not satisfy the third determination condition, it is determined whether the measured wave profile satisfies the fourth determination condition (Step 4). Afterward, if the measured wave profile turns out to satisfy the third determination condition, the road surface is also estimated at in a dry state. In Step 4, if the measured wave profile turns out to not satisfy the forth determination condition, the road surface is estimated at in a slushy or snowy state and the process of estimating a road surface state is completed.

The following system for estimating a road surface can be exemplified as an example of a system using the above-mentioned road-surface-state estimating device 10. That is, the system has plural probe cars which, in order to estimate a road surface state within a given area, are equipped with the road-surface-state estimating device 10 including the sound detection unit 20 for estimating a road surface state, and which estimate a state of the road surface on which the vehicle is running by means of the device 10, and a base station providing the estimated position of the road surface with the respective probe cars. The probe cars transmit positional data of the road surface which is voluntarily established or established on the basis of the provision from the base station and road surface state data estimated with respect to the above-mentioned road surface. The base station receives the data transmitted from the probe cars, determines a position of the road surface where the state is to be supplementary estimated on the basis of the received date, and the probe car conducting the supplemental estimation. The base station is also adopted to transmit the position of the road surface to be estimated to the determined probe car. The system thus configured can estimate the road surface state in the area efficiently.

EXAMPLES

A vehicle was actually driven to examine relevance of an estimated state of a road surface based on a sound detection signal from a ground contact surface sound detection unit during the driving with respect to an actual condition of a road surface on which the vehicle was driven. The road surface states to be distinguished were categorized as dry, wet, frozen and slushy/snowy states, and the estimations were done according to the above-mentioned method.

A four-wheel-drive vehicle was used as a test vehicle. A microphone was housed in a container and the container was mounted so as to be able to collect sounds from anterior of the rear wheel of the vehicle. The vehicle was traveled along general roads in Hokkaido and Tohoku areas in Japan at 30-70 km/h. The sounds were collected during the travel. Table 1 shows the results of the determination, where the rates are indicated in percent.

TABLE 1

| Road surface state | | Result of determination from sounds | | | | |
|---|---|---|---|---|---|---|
| | | Wet | Dry | Frozen | Slushy/ Snowy | Total of evaluation |
| Wet | Number of determination | 217 | 14 | 11 | 7 | 249 |
| | Rate | <87> | 6 | 4 | 3 | |
| Dry | Number of determination | 27 | 1311 | 9 | 252 | 1599 |
| | Rate | 2 | <81> | 4 | 16 | |
| Frozen | Number of determination | 61 | 2 | 618 | 83 | 764 |
| | Rate | 8 | 0 | <81> | 11 | |
| Slushy/ snowy | Number of determination | 256 | 41 | 125 | 787 | 1209 |
| | Rate | 21 | 3 | 10 | <66> | |

As apparent from Table 1, the accuracy rates for the states other than slushy state are more than 80%, which is high.

INDUSTRIAL APPLICABILITY

A device for estimating a road surface state of the above-mentioned type is applicable for, for example, managing snow roads.

REFERENCE SYMBOLS 1 microphone
2 computing unit
3 display unit
4 container
5 container body
6 cover
7 sponge
10 device for estimating a road surface state
11 sound detection unit for estimating a road surface state

The invention claimed is:

1. A method for estimating a road surface state, the method estimating the current road state on which a vehicle is running at one of predetermined road states based on a sound detection signal from a ground contact surface sound detection unit for detecting a sound in the vicinity of the ground contact surface of the tire of the running vehicle, comprising:

calculating a wave profile of frequency dispersion as said sound detection signal by executing a 1/N octave analysis of said detected sound during the vehicle being running, and determining whether said calculated wave profile of frequency dispersion (hereinafter referred to as a "measured wave profile") satisfies predetermined determination conditions of the respective road surface states to estimate the road surface state, wherein a microphone arranged in a container is used to detect said sound, and said determining step is adapted to apply said determination conditions to said measured wave profile including a resonance caused by the container, and wherein a first determination condition is such that a minimum value of a sound pressure of a band having higher frequency than a band including a frequencies of said resonance caused by the container (hereinafter referred to as a "container resonance frequency band") is larger than a minimum value of a sound pressure of a band having lower frequency than the container resonance frequency band, a second determination condition is such that five frequency bands including a band where the sound pressure is the smallest out of bands having lower frequency than the container resonance frequency band contain two bands where the sound pressure is minimal or minimum, a third determination condition is such that a sound pressure of a band having a second lowest frequency is larger than sound pressures of any other band having lower frequencies than the container resonance frequency band, a fourth determination condition is such that the container resonance frequency band is referred to as a band X, a band having the lowest frequency among bands having higher frequencies than the container resonance frequency band having a lower sound pressure than a minimum sound pressure of the bands having lower frequency than the container resonance frequency band is referred to a band Y, and all bands between the band X and the band Y have higher sound pressures than a straight line connecting the sound pressures of the bands X and Y, and the road surface state is estimated with at least one of the first to fourth determination conditions.

2. The method for estimating a road surface state according to claim 1, wherein a sound from anterior of a rear wheel of the vehicle is used as said sound to be detected.

3. The method for estimating a road surface state according to claim 1, wherein, when the measured wave profile satisfies the first determination condition, the road surface corresponding to the measured wave profile is estimated at in a wet state.

4. The method for estimating a road surface state according to claim 1, wherein, when the measured wave profile satisfies the second determination condition, the road surface corresponding to the measured wave profile is estimated at in a frozen state.

5. The method for estimating a road surface state according to claim 1, wherein, when the measured wave profile satisfies at least one of the third and fourth determination conditions, the road surface corresponding to the measured wave profile is estimated at in a dry state.

6. The method for estimating a road surface state according to claim 1, wherein, when the measured wave profile satisfies none of the first to fourth determination conditions, the road surface corresponding to the measured wave profile is estimated at in a slushy or snowy state.

7. The method for estimating a road surface state according to claim 1, further comprising:

comparing, in a first step, the measured wave profile with said first determination condition, and, when the measured wave profile satisfies the first determination condition, estimating the road surface corresponding to the measured wave profile at in a wet state;

when the measured wave profile does not satisfy the first determination condition in the first step, subsequently comparing, in a second step, the measured wave profile with said second determination condition, and, when the measured wave profile satisfies the second determination condition, estimating the road surface corresponding to the measured wave profile at in a frozen state;

when the measured wave profile does not satisfy the second determination condition in the second step, subsequently comparing, in a third step, the measured wave profile with said third and fourth determination conditions, and, when the measured wave profile satisfies at least one of the third and fourth determination conditions, estimating the road surface corresponding to the measured wave profile at in a dry state; and when the measured wave profile does not satisfy the third and fourth determination conditions in the third step, estimating the road surface corresponding to the measured wave profile at in a slush or snowy state.

* * * * *